United States Patent
Tomioka

(10) Patent No.: US 12,535,627 B2
(45) Date of Patent: Jan. 27, 2026

(54) OPTICAL ASSEMBLY

(71) Applicant: TOPPAN Inc., Taito-ku (JP)

(72) Inventor: Shungo Tomioka, Taito-ku (JP)

(73) Assignee: TOPPAN Inc., Taito-ku (JP)

( * ) Notice: Subject to any disclaimer, the term of this patent is extended or adjusted under 35 U.S.C. 154(b) by 378 days.

(21) Appl. No.: 18/299,753

(22) Filed: Apr. 13, 2023

(65) Prior Publication Data

US 2023/0244013 A1     Aug. 3, 2023

Related U.S. Application Data

(63) Continuation of application No. PCT/JP2021/036799, filed on Oct. 5, 2021.

(30) Foreign Application Priority Data

Oct. 13, 2020   (JP) .................. 2020-172704

(51) Int. Cl.
*G02B 5/20*     (2006.01)
*G02B 1/10*     (2015.01)
*G02B 5/18*     (2006.01)

(52) U.S. Cl.
CPC ............ *G02B 5/1866* (2013.01); *G02B 1/10* (2013.01); *G02B 2005/1804* (2013.01); *G02B 5/208* (2013.01)

(58) Field of Classification Search
None
See application file for complete search history.

(56) References Cited

U.S. PATENT DOCUMENTS

| | | | |
|---|---|---|---|
| 2013/0032914 A1 | 2/2013 | Iwasaki | |
| 2013/0222911 A1* | 8/2013 | Coggio | G02B 5/0242 359/493.01 |
| 2014/0284747 A1 | 9/2014 | Takakuwa et al. | |
| 2015/0140316 A1* | 5/2015 | Steiner | B05D 1/305 427/407.1 |
| 2017/0131439 A1* | 5/2017 | Kobori | C08J 7/18 |
| 2019/0154883 A1* | 5/2019 | Byun | G02B 5/0242 |

FOREIGN PATENT DOCUMENTS

| | | |
|---|---|---|
| JP | 2013-038164 A | 2/2013 |
| JP | 2014-074874 A | 4/2014 |
| JP | 2019-195051 A | 11/2019 |

OTHER PUBLICATIONS

International Search Report issued Dec. 7, 2021 in International Application No. PCT/JP2021/036799 filed Oct. 5, 2021, 5 pages (with English Translation).

* cited by examiner

*Primary Examiner* — Derek S. Chapel
(74) *Attorney, Agent, or Firm* — Oblon, McClelland, Maier & Neustadt, L.L.P.

(57) ABSTRACT

An optical assembly including a layer including a low refractive index material and a medium, and a functional layer formed on a surface of the layer. The layer includes the low refractive index material at a content of 60%-76% by mass.

4 Claims, 4 Drawing Sheets

STAINS

STAINS

OPTICAL ASSEMBLY

CROSS-REFERENCE TO RELATED APPLICATIONS

The present application is a continuation of International Application No. PCT/JP2021/036799, filed Oct. 5, 2021, which is based upon and claims the benefits of priority to Japanese Application No. 2020-172704, filed Oct. 13, 2020. The entire contents of all of the above applications are incorporated herein by reference.

BACKGROUND OF THE INVENTION

Field of the Invention

The present invention generally relates to an optical assembly.

Discussion of the Background

In recent years, development of range image sensors that capture an image containing information about the distance to an object has been progressing. Examples of the range image sensor include a TOF-type sensor, a Stereo Vision type sensor, and a Structured Light type sensor. The TOF type sensor detects the time of flight (TOF) from irradiating an object with an optical signal such as infrared light to receiving light reflected from the object to acquire information on the distance to the object based on the TOF. The Stereo Vision type sensor (or stereo vision) acquires distance information to the object by triangulation using two cameras. The Structured Light type sensor uses a projector instead of the camera described above. The above-described sensors are difficult to reduce the housing and installation space, and consume large amounts of power.

Range image sensors have also been applied to image authentication systems such as mobile phones. There is a demand for a range image sensor that is less expensive and smaller in size to be integrated into portable and thin mobile phones. For example, JP 2019-195051 A describes a device having a laminated structure which includes a photoelectric conversion portion, a microlens disposed on the photoelectric conversion portion, a translucent plate covering the microlens, and a functional film (membrane) provided between the microlens and the translucent plate. The refractive index of the functional film is 1.05 to 1.15, and the functional film contains particles composed of solid materials such as resin, and a binder that binds the particles together.

SUMMARY OF THE INVENTION

According to an aspect of the present invention, an optical assembly includes a layer including a low refractive index material and a medium, and a functional layer formed on a surface of the layer. The layer includes the low refractive index material at a content of 60%–76% by mass.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
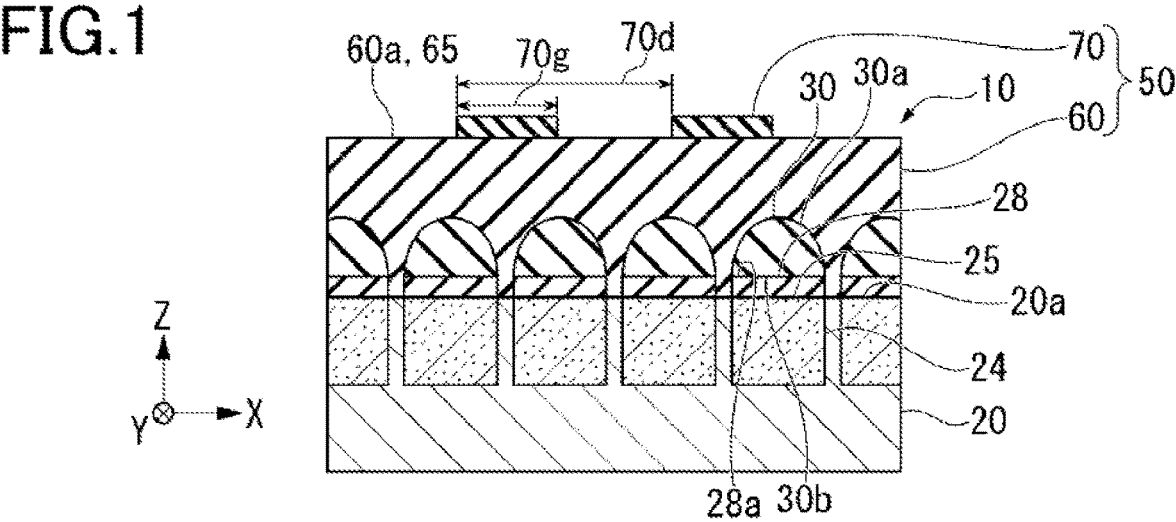
FIG. 1 is a side sectional view of an optical assembly according to an embodiment of the present invention.

The embodiments will now be described with reference to the accompanying drawings, wherein like reference numerals designate corresponding or identical elements throughout the various drawings.

With reference to the drawings, embodiments of the present invention will be described.

As shown in FIG. 1, an optical assembly 50 according to an embodiment of the present invention is provided in a range image sensor 10. The range image sensor 10 includes a substrate 20, a CMOS image sensor 24, a color filter 28, a microlens 30, and an optical assembly 50.

The substrate 20 is, for example, a silicon (Si) substrate. The material of the substrate is, for example, Si, but is not particularly limited as long as the material is capable of providing pixels and light-receiving elements such as a CMOS image sensor 24 and making them electrically functional. Hereinafter, the thickness direction of the substrate 20 is referred to as the Z direction, and the direction from the inside of the substrate 20 toward the surface 20a in the Z direction is defined as the "front." A direction parallel to the surface 20a and orthogonal to the Z direction is referred to as the X direction, and a direction parallel to the surface 20a and orthogonal to the X direction and the Z direction is referred to as the Y direction.

The range image sensor 10 includes a plurality of CMOS image sensors 24. A plurality of CMOS image sensors 24 are arranged along each of the X direction and the Y direction. The plurality of CMOS image sensors 24 thus provided constitute a pixel array of the range image sensor 10 in the directions along the surface 20a of the substrate 20. The number of CMOS image sensors 24 provided in the range image sensor 10 is set appropriately according to the use of the range image sensor 10, and at least some of them are illustrated in FIG. 1.

Respective CMOS image sensors 24 are embedded in the surface 20a side of the substrate 20 in the Z direction. A light-receiving surface 25 of the CMOS image sensor 24 is exposed from the substrate 20 and is substantially flush with the surface 20a. The detailed structure of the CMOS image sensor 24 is not shown in FIG. 1, etc. The detailed structure of the CMOS image sensor 24 is similar to that of a known CMOS image sensor.

The color filter 28 is provided on the light-receiving surface 25 of the respective CMOS image sensors 24 (Specifically, the Z direction frontward side). The color filter 28 has a function of transmitting light in the wavelength band of any of the three primary colors of light, red (R), green (G), and blue (B). The color transmitted by the color filter 28 is appropriately determined for each of the plurality of CMOS image sensors 24 according to the arrangement of the plurality of CMOS image sensors 24.

The microlens 30 is provided on the surface 28a of the color filter 28 on the respective CMOS image sensors 24. (Specifically, front side in the Z direction). The microlens 30 is a so-called plano-convex lens having a bottom surface 30b and a lens surface 30a. The material of microlens 30 has a refractive index that is at least higher than the refractive index of air or the low refractive index layer 60. In particular, the material of the microlenses 30 is preferably a high refractive index material having a refractive index of 1.4 to 1.6 in order to obtain a refractive index of 1.4 to 1.6 in order to obtain a refractive index difference with the lower refractive index layer 60 and enhance the light focusing action of the microlenses. The curvature and shape of the lens surface 30a are appropriately designed according to the refractive index at visible wavelengths of the material of the microlens 30. The microlens 30 is also formed and arranged so that light entering from the Z direction frontward side in the opposite direction to the Z direction is focused on the CMOS image sensor 24 through the (that is, the Z direction rearward side) color filter 28 below.

The optical assembly 50 is provided further to the Z direction frontward side than the substrate 20 is, and covers a plurality of color filters 28 and a plurality of microlenses 30, and also includes a low refractive index layer (layer) 60 and a diffraction grating (functional layer) 70.

The low refractive index layer 60 is arranged to form a flat surface 65 at the surface 60a in the Z direction frontward side to provide a diffraction grating 70 further to the Z direction frontward side than the microlens 30 is, and to physically fill the space between the flat surface 65 and the surface 20a of the substrate 20 exposed between the color filter 28 and microlens in the Z direction. The maximum thickness (that is, the magnitude in the Z direction of the low refractive layer 60 lying between the flat surface 65 and the surface 20a) of the low refractive index layer 60 is set to a predetermined thickness and appropriately determined according to the optical path length required for light entering the microlens 30 from the Z direction frontward side.

The "low" of the low refractive index layer 60 means that it has a refractive index at least lower than that of the microlens 30 and as close as possible to that of air. Since the refractive index of the low refractive index layer 60 is close to that of air, the refractive index difference between the low refractive index layer 60 and the microlens 30 can be increased. As a result, refraction of light entering the diffraction grating 70 from the Z direction frontward side in the opposite direction to the Z direction can be suppressed, and the path of light entering the diffraction grating 70 can be directed in a predetermined direction. This allows the light to be well focused on the CMOS image sensor 24 by the microlens 30, resulting in desired optical properties in the range image sensor 10. Ideally, the refractive index of the low refractive index layer 60 at visible wavelengths is desirably equal to 1, which is the refractive index of air. From the viewpoint of selecting a material for the low refractive index layer 60, the refractive index of the low refractive index layer 60 at the visible wavelength is more preferably 1.25 or more and 1.33 or less, and more preferably 1.27 or more and 1.30 or less. The effect of the present invention is obtained when the refractive index of the low refractive index layer 60 at the visible wavelength is 1.25 or more. The refractive index of the low refractive index layer 60 is adjusted accordingly, taking into account the type of low refractive index material described next and the content of the low refractive index material in the low refractive index layer 60.

The low refractive index layer 60 contains a low refractive index material and a medium. Low refractive index materials and media are transparent at visible wavelengths, e.g., having an overall light transmittance of 90% or more for light at visible wavelengths. The low refractive index material contributes to making the refractive index of the low refractive index layer 60 as close to the refractive index of air as possible. The medium is interposed between the particles of the low refractive index material and serves as an adhesive or adhesive agent to adhere the low refractive index materials to each other and stabilize the low refractive index layer 60.

The content of the low refractive index material in the low refractive index layer 60 is preferably 60% by mass or more and 76% by mass or less, and 70% by mass or more and 76% by mass or less. When the content of the low refractive index material in the low refractive index layer 60 is less than 60% by mass, the contribution of the low refractive index material to the refractive index of the low refractive index layer 60 is decreased and the refractive index of the low refractive index layer 60 becomes excessively high, and so refraction of the light entering the diffraction grating 70 cannot be suppressed as described above. In addition, when the content of the low refractive index material in the low refractive index layer 60 exceeds 76% by mass, the relative amount of the medium to the low refractive index material in the low refractive index layer 60 decreases greatly, and the gap between the particles of the low refractive index material increases. In that case, as described later, when the material of the diffraction grating is formed in layers on the low refractive index layer 60, the material of the diffraction grating penetrates into the gap between the particles of the low refractive index material, and stains are formed in the low refractive index layer 60. As a result, stains act as a wavefront transformation pattern to the light, and stains diffuse the light, making it difficult for the microlens 30 to focus the light to the CMOS image sensor 24. That is, if the content of the low refractive index material in the low refractive index layer 60 is not in the range of 60% by mass or more and 76% by mass or less, refraction of the light entering the diffraction grating 70 cannot be suppressed when the optical assembly 50 is applied to the range image sensor 10. As a result, it is difficult to focus the light onto the CMOS image sensor 24, resulting in poor appearance of the optical assembly 50, and the desired optical characteristics cannot be obtained.

The low refractive index material is preferably an inorganic hollow filler that contains, for example, silicon dioxide (Silica, $SiO_2$) and made of an inorganic substance such as $SiO_2$. The inclusion of $SiO_2$ in the low refractive index material makes it inexpensive and provides high transparency and physical stability for visible wavelengths. In addition, because the low refractive index material is an inorganic hollow filler, air regions formed by inorganic hollow fillers are scattered inside the low refractive index layer 60, and the refractive index of the entire low refractive index layer 60 becomes closer to the refractive index of air, thus suppressing increase of the refractive index of the low refractive index layer 60.

When the low refractive index material is a hollow filler of $SiO_2$, both the advantages of having $SiO_2$ and the advantages of having inorganic hollow fillers are obtained. When $SiO_2$ hollow filler is used and the hollow filler is approximately spherical in shape, the average inner diameter of the hollow portion relative to the average particle diameter of the hollow filler is approximately 50%, for example, and from the viewpoint of exhibiting moderate strength, it is 40% or more and 60% or less.

The diffraction grating 70 is periodically provided on the surface 60a of the low refractive index layer 60 at predetermined intervals in the X direction and the Y direction. The light entering the diffraction grating 70 from the Z direction frontward side in the direction opposite to the Z direction is diffracted by the diffraction grating 70 near the flat surface 65 (that is, a diffraction surface), diffracted at the diffraction angle determined by the wavelength of the light and the pitch 70d of the diffraction grating 70 with respect to the normal along the Z direction, and travels in different directions for each wavelength. The size 70g and the pitch 70d of the diffraction grating 70 in each of the X and Y directions are appropriately designed so that, of the light diffracted by the diffraction grating 70 as described above, the light of each color of RGB is irradiated to the microlens 30 overlapping the corresponding color filter 28 in the X and Y directions and the CMOS image sensor 24.

The diffraction grating 70 is transparent at visible wavelengths and has an overall light transmittance of 90% or more for light at visible wavelengths, for example. The material of the diffraction grating 70 is not particularly limited as long as it is transparent to visible wavelength light as described above and can diffract entering light in a desired direction for each wavelength. As described below, when the diffraction grating 70 is formed using patterning and photolithography methods, a more patternable material is suitable for the material of the diffraction grating 70, for example, a resin material containing acrylic resin.

Next, an example of the production method of the optical assembly 50 will be described. The CMOS image sensor 24, the color filter 28, and the microlens 30 are each formed by a known production method. For example, as a method of forming a plurality of CMOS image sensors 24 on a substrate 20 such as a Si substrate, patterning and photolithography methods can be used in the same manner as the optical assembly 50, and reactive ion etching (RIE) can be used. A method of forming the color filter 28 is, for example, to apply a pigment-based color resist on the surface 20a of the substrate 20 and on the light-receiving surface 25 of the CMOS image sensor 24, and to repeatedly conduct the exposure, development and baking processes for the 3 colors of RGB based on the photolithography method. One method for forming the microlens 30 is, for example, to apply a layer of the high refractive index material of the microlens 30 at least on the surface 28a of the color filter 28, provide a photoresist layer on top of it, and to etch and transfer the lens pattern by thermal melting after the photolithography process onto the underlying layer of the high refractive index material.

Figure 2:
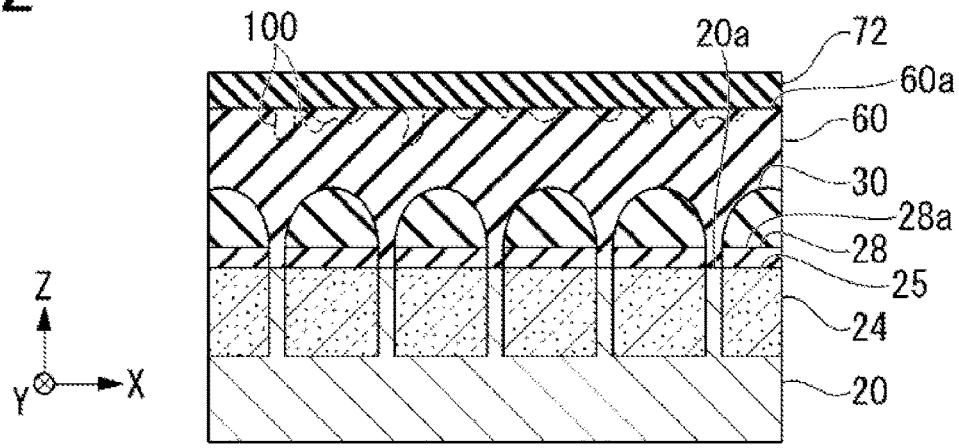
FIG. 2 is a side sectional view for describing a method for producing the optical assembly illustrated in FIG. 1.

Then, as shown in FIG. 2, a low refractive index material is provided to cover the surface 20a of the color filter 28 and microlens 30 and the substrate 20 exposed between the color filter 28 and the microlens 30, and a low refractive index layer 60 is formed. Then, the surface 60a in the Z direction frontward side of the low refractive index layer 60 is flattened. A method of forming the low refractive index layer 60 is, for example, to apply a low refractive index material to the surface 20a of the substrate 20 and thermally cure it.

Then, as shown in FIG. 2, a material 72 of the diffraction grating 70 is applied to the surface 60a of the low refractive index layer 60 at a predetermined thickness. The material 72 is a patternable material that can realize the optical properties required for the diffraction grating 70 and is photosensitive, for example, a resin material such as acrylic resin.

Figure 3:
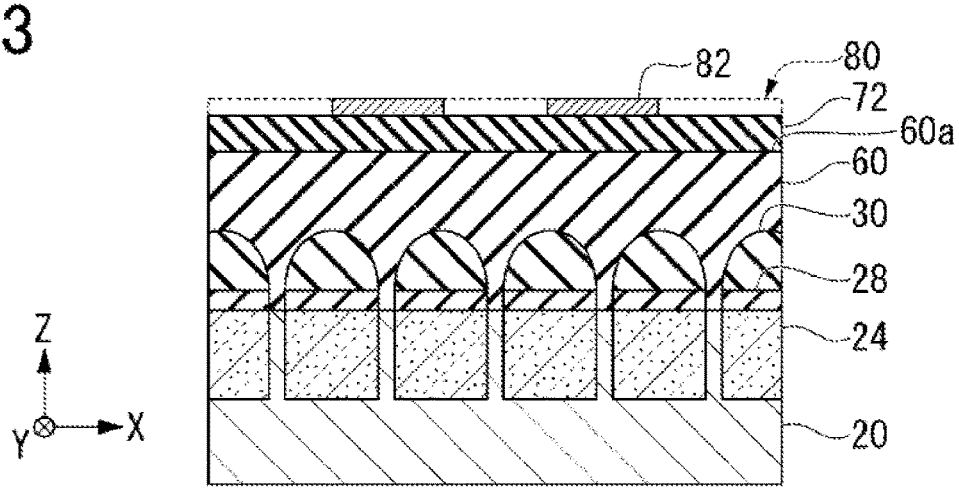
FIG. 3 is a side sectional view for describing a method for producing the optical assembly illustrated in FIG. 1.

Then, a photomask 80 is placed on the material 72 coated on the surface 60a of the low refractive index layer 60 (that is, the Z direction frontward side), as shown in FIG. 3. The photomask 80 has a pattern similar to that of the diffraction grating 70, and a light-shielding material 82 such as chromium (Cr) is provided only in the portion where the diffraction grating 70 is formed in the X and Y directions as shown in FIG. 3, for example. The portions of the photomask 80 other than the light-shielding material 82 are formed of, for example, quartz ($SiO_2$) or the like, to allow light (for example, ultraviolet light) to pass through in the Z direction during pattern transfer in the photolithography process.

Then, in the setting shown in FIG. 3, patterning is performed, the material 72 is exposed from the Z direction frontward side of the photomask 80 in the opposite direction to the Z direction, and the pattern of the photomask 80 is transferred to the material 72. By this process, the material 72 is exposed except for the portion overlapping the light-shielding material 82 in the Z direction. A diffraction grating 70 is formed on the surface 60a of the low refractive index layer 60 as shown in FIG. 1, by removing the photomask 80 from the material 72 and removing the material 72 in the exposed area using a suitable chemical solution. By performing each of the above processes, the optical assembly 50 and the range image sensor 10 having the optical assembly 50 shown in FIG. 1 can be produced.

Next, the effect of rise in refractive index and the effect of stain occurrence of the low refractive index layer 60 by the optical assembly 50 described above will be described using experimental data.

In the experiment, a mixture of $SiO_2$ hollow filler (low refractive index material) and a binder (medium) was prepared as a material (hereinafter referred to as a low refractive index layer material) for the low refractive index layer 60 in order to produce a sample of the optical assembly 50. The average particle size of the $SiO_2$ hollow filler was 60 nm. The average diameter of the hollow portion of the $SiO_2$ hollow filler was 40 nm, and the average thickness in the radial direction of $SiO_2$ in the outer portion was 10 nm. Using these $SiO_2$ hollow fillers and binders, the content of the SiO₂ hollow fillers (that is, the mass % ratio in the low refractive index layer material) was varied in using 5 types: 91% by mass %, 81% by mass, 76% by mass, 71% by mass %, and 66% by mass, and the low refractive index layer materials <1> to <5> were adjusted in the order described above.

Next, a Si substrate having a thickness of 725 μm was prepared as the substrate 20. For each of the low refractive index layer materials <1> to <5>, a first sample, in which a low refractive index layer material was formed on the Si substrate and a diffraction grating formation layer was formed on the low refractive index layer material, and a second sample, in which only a diffraction grating formation layer was formed on the Si substrate, were prepared. In other words, each of the low refractive index layer materials <1> to <5> and the diffraction grating formation layer materials were formed on the Si substrate as a so-called solid film. As the material of the diffraction grating formation layer, a transparent thermosetting resin material consisting mainly of acrylic resin was used as the material constituting the grating 70.

Figure 4:
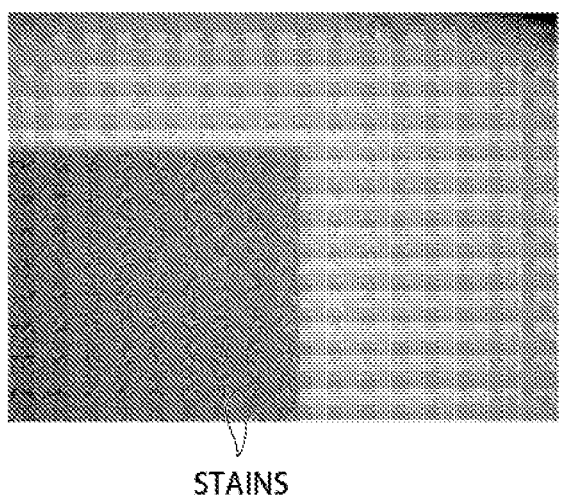
FIG. 4 is a photograph of a sample of an optical assembly observed under a metallurgical microscope with a 5 times objective lens, the sample using a low refractive index layer material having an $SiO_2$ hollow filler content of 91% by mass.
Figure 5:
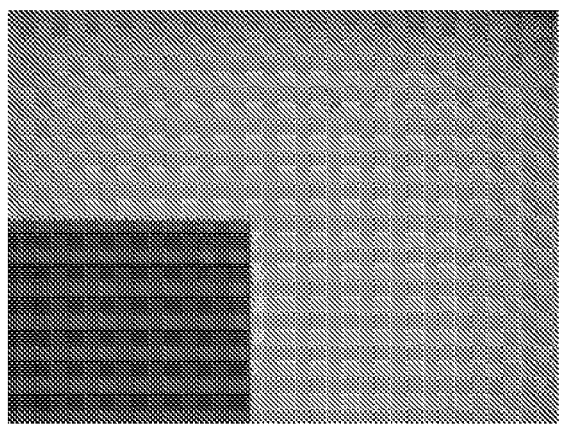
FIG. 5 is a photograph of a sample of an optical assembly observed under a metallurgical microscope with a 5 times objective lens, the sample using a low refractive index layer material having an $SiO_2$ hollow filler content of 76% by mass.
Figure 6:
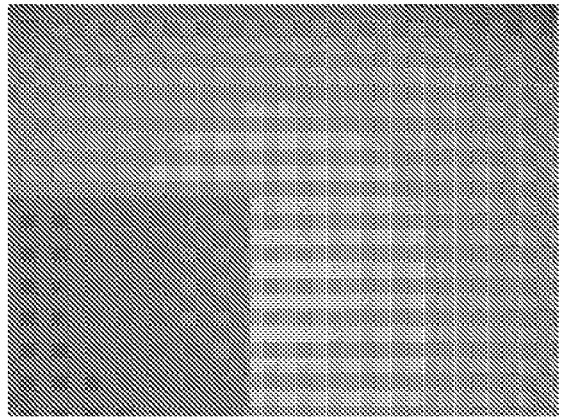
FIG. 6 is a photograph of a sample of an optical assembly observed under a metallurgical microscope with a 5 times objective lens, the sample using a low refractive index layer material having an $SiO_2$ hollow filler content of 71% by mass.
Figure 7:
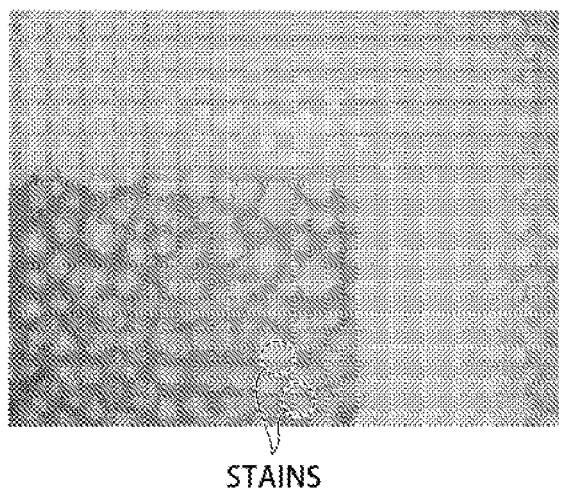
FIG. 7 is a photograph of a sample of an optical assembly observed under a metallurgical microscope with a 20 times objective lens, the sample using a low refractive index layer material having an $SiO_2$ hollow filler content of 91% by mass.
Figure 8:
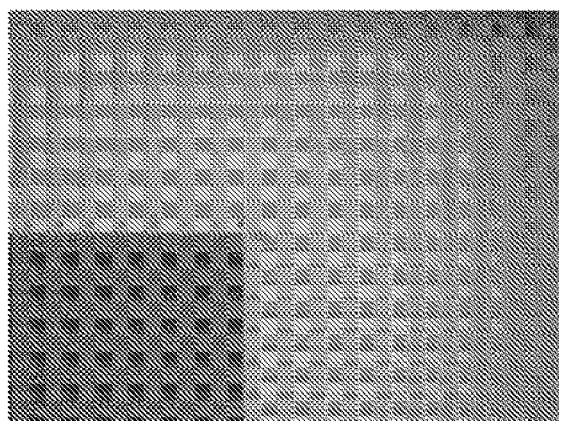
FIG. 8 is a photograph of a sample of an optical assembly observed under a metallurgical microscope with a 20 times objective lens, the sample using a low refractive index layer material having an $SiO_2$ hollow filler content of 76% by mass.
Figure 9:
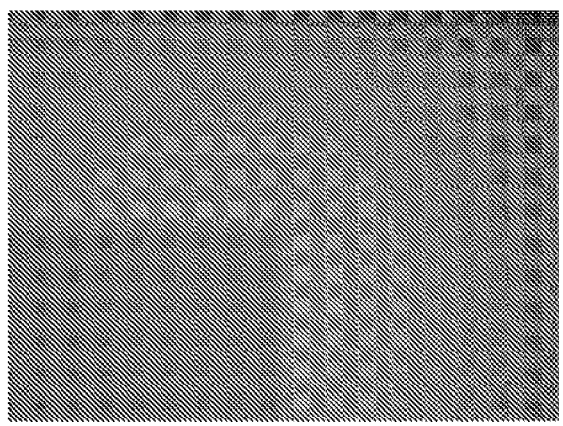
FIG. 9 is a photograph of a sample of an optical assembly observed under a metallurgical microscope with a 20 times objective lens, the sample using a low refractive index layer material having an $SiO_2$ hollow filler content of 71% by mass.

FIGS. 4 to 6 are photographs of the first samples of the optical assembly which use the low refractive index layer materials <1>, <3>, and <4>, observed from the diffraction grating formation layer side along the thickness direction of the optical assembly with a 5 times (×5) objective lens of a metallurgical microscope (model number; MX50 manufactured Olympus Corporation). FIGS. 7 to 9 are also photographs of the first samples of the optical assembly which use the low refractive index layer materials <1>, <3> and <4>, observed from the diffraction grating formation layer side along the thickness direction of the optical assembly with a 20 times (×20) objective lens of the aforementioned metallurgical microscope. As shown in FIGS. 4 and 7, when the low refractive index layer material <1> was used, that is, when the content of SiO₂ hollow filler in the low refractive index layer material was 91% by mass, speckled stains were formed on the entire surface of the low refractive index layer. As shown in FIGS. 5, 6, 8 and 9, when the low refractive index layer materials <3> and <4> were used, that is, when the contents of SiO₂ hollow filler in the low refractive index layer materials were 76% by mass or 71% by mass, no stains were formed anywhere on the entire surface of the low refractive index layer.

Next, the penetration amount and the refractive index of the diffraction grating formation layer amount in each of the low refractive index layer materials <1> to <5> were measured. Regarding the amount of penetration, based on the film thickness measurement by a step meter (model number; P-16, manufactured by KLA-Tencor Corporation), the total thickness (A) of the low refractive index layer and the diffraction grating forming layer in the first sample minus the thickness (B) of only the low refractive index layer in the first sample was measured as the difference (C). The thickness (D) of the diffraction grating formation layer in the second sample was then measured using the step meter described above, and the amount of penetration was calculated as (D)-(C). The results of the measurements (A), (B), (C) and (D) for each of the low refractive index layer materials <1> to <5> are shown in Table 1.

TABLE 1

| Low refractive index layer material | Filler content | (A) [μm] | (B) [μm] | (C) [μm] | (D) [μm] |
|---|---|---|---|---|---|
| <1> | 91% by mass | 1.93 | 1.56 | 0.37 | 0.83 |
| <2> | 81% by mass | 2.00 | 1.56 | 0.44 | 0.83 |

TABLE 1-continued

| Low refractive index layer material | Filler content | (A) [μm] | (B) [μm] | (C) [μm] | (D) [μm] |
|---|---|---|---|---|---|
| <3> | 76% by mass | 2.27 | 1.50 | 0.77 | 0.83 |
| <4> | 71% by mass | 2.37 | 1.53 | 0.84 | 0.83 |
| <5> | 66% by mass | 2.31 | 1.51 | 0.87 | 0.83 |

For each of the low refractive index layer materials <1> to <5>, the results of measuring the penetration amount and the refractive index of the diffraction grating formation layer materials are shown in Table 2. The "Filler content" column in Table 1 indicates the content of SiO₂ hollow filler in the low refractive index layer material. In the "Determination" column in Table 2, when the conditions of the refractive index being 1.33 or less and the penetration amount being 0.06 μm or less were satisfied, it was rated as "Good", and when the above conditions were not satisfied, it was rated as "Poor".

TABLE 2

| Low refractive index layer material | Filler content | Refractive index | Penetration amount | Determination |
|---|---|---|---|---|
| <1> | 91% by mass | 1.21 | 0.46 μm | Poor |
| <2> | 81% by mass | 1.25 | 0.39 μm | Poor |
| <3> | 76% by mass | 1.27 | 0.06 μm | Good |
| <4> | 71% by mass | 1.30 | 0 μm | Good |
| <5> | 66% by mass | 1.33 | 0 μm | Good |

Figure 10:
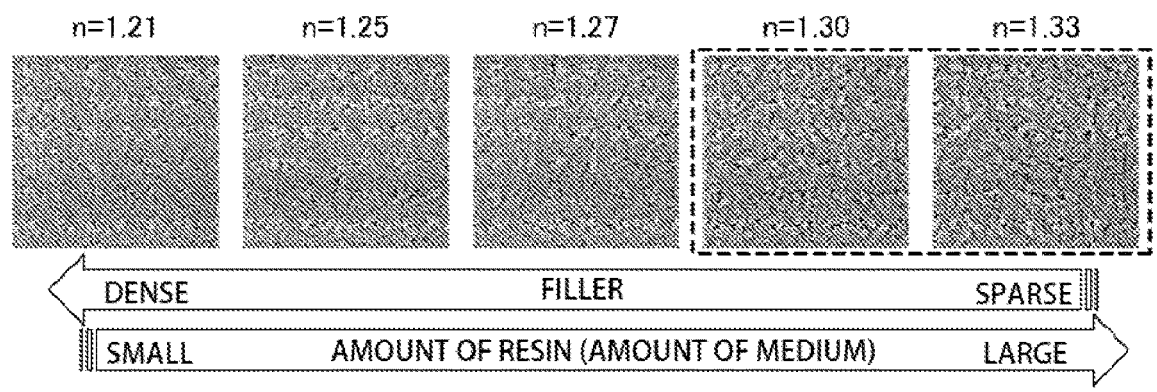
FIG. 10 is a photograph, obtained by CD-SEM, of the cross section of the low refractive index layer of the prototype optical assembly.

In addition, FIG. 10 shows photographs of the cross-sectional shapes of the low refractive index layers in the first samples of the respective low refractive index layer materials <1> to <5> observed at ×100 k using a CD-SEM (critical dimension scanning electron microscope (SEM), model number; eCD2XP, manufactured by KLA-Tencor Corporation). The variable n in FIG. 10 represents the refractive index of each of the low refractive index layer materials <1> to <5>. As shown in FIG. 10 and Table 2, the lower the content of SiO₂ hollow filler in the low refractive index layer material, the lower (specifically, "sparse") the concentration of SiO₂ hollow filler and the higher the content of binder (resin, medium) in the low refractive index layer material. Therefore, the SiO₂ hollow fillers adhere to each other via the binder, and the gaps between the SiO₂ hollow fillers, that is, the total volume of voids in the low refractive index layer, is reduced, and as a result, stains do not occur.

On the other hand, as shown in FIG. 10 and Table 2, the higher the content of the SiO₂ hollow filler in the low refractive index layer material, the higher (specifically, "dense") the concentration of the SiO₂ hollow filler and the lower the binder content in the low refractive index layer material. Therefore, it is considered that the SiO₂ hollow fillers did not adhere to each other via the binder, the gaps between the SiO₂ hollow fillers widened, and the total volume of the voids in the low refractive index layer increased, and as a result, stains occurred. In the unlikely event that voids are formed in the X, Y, and Z directions (especially in the Z direction) in the low refractive index layer 60, it is inferred that the material 72 (that is, the transparent resin material of the diffraction grating formation layer in the experiment) of the diffraction grating 70 penetrates into the voids 100 from the surface 60a in the opposite direction to the Z direction, as illustrated by the two-dot chain line in FIG. 2, and the penetration substantially stops when the material 72 hardens. As a result, the smaller the content of the $SiO_2$ hollow filler in the low refractive index layer material, the more stains appeared in the area close to the surface 60a in the Z direction of the low refractive index layer 60.

As shown in FIG. 10 and Table 2, the lower the content of the $SiO_2$ hollow filler in the low refractive index layer material, the lower the total volume of the hollow portion in the low refractive index layer 60 and the higher the refractive index of the low refractive index layer 60. When the content of the $SiO_2$ hollow filler in the low refractive index layer material is less than 60% by mass, the refractive index of the low refractive index layer 60 becomes excessively high, for example, exceeding 1.33. On the other hand, the higher the content of the $SiO_2$ hollow filler in the low refractive index layer material, the higher the total volume of the hollow portion in the low refractive index layer 60 and the lower the refractive index of the low refractive index layer 60.

From the results of the above experiment, it was confirmed that the low refractive index layer materials <3> to <5> satisfy the conditions of the refractive index of the low refractive index layer 60 being 1.33 or less and the penetration amount being 0.06 μm or less, and that the content of the $SiO_2$ hollow filler in the low refractive index layer materials is 66% by mass or more and 76% by mass or less. Furthermore, considering the effect of increasing the refractive index, it is considered that the content of $SiO_2$ hollow filler in the low refractive index layer material of 60% by mass or more and 76% by mass or less is effective in suppressing both the refractive index increase and the stain occurrence.

The optical assembly 50 of the present embodiment described above includes a low refractive index layer 60 containing a low refractive index material and a medium; and a diffraction grating 70 which is arranged on the surface 60a of the low refractive index layer 60. The content of the low refractive index material in the low refractive index layer 60 is 60% by mass or more and 76% by mass or less.

In the above configuration, when the content of the low index material in the low index layer 60 is 60% by mass or more, the refractive index of the low index layer 60 can be set to a realistic value while being as close to the refractive index of air as possible. On the other hand, in the above configuration, when the content of the low refractive index material in the low refractive index layer 60 is 76% by mass or less, particles of the low refractive index material adhere to each other via the medium, leaving almost no voids in the low refractive index layer 60, and this prevents the material of the diffraction grating 70 from penetrating into the low refractive index layer 60. According to the above configuration, it is possible to suppress the rise of the refractive index and poor appearance of the low refractive index layer 60 (i.e., flattening layer portion), and prevent formation of stains due to the material of the diffraction grating formed on the surface 60a of the low refractive index layer 60 penetrating into the flattening layer.

In the optical assembly 50 of the present embodiment, the low refractive index layer 60 has a refractive index at visible wavelengths of 1.25 or more and 1.33 or less. According to the optical assembly 50 of the present embodiment, refraction of light in the low refractive index layer 60 can be suppressed, and light entering adjacent structures in the Z direction (that is, the thickness direction) of the low refractive index layer 60 can proceed in the desired direction. The range image sensor 10 including the optical assembly 50 can reduce the refraction of light in the low index layer 60 and allows the light traveling through the low refractive index layer 60 to be passed through the desired color filter 28 by the microlens 30 and to be well focused on the desired CMOS image sensor 24. As a result, desired optical properties in the range image sensor 10 can be achieved.

In the optical assembly 50 of the present embodiment, the low refractive index material of the low refractive index layer 60 contains silicon dioxide ($SiO_2$). According to the optical assembly 50 of the present embodiment, good transparency at visible wavelengths of the low refractive index layer 60 and a refractive index close to that of air to some extent can be achieved.

Furthermore, in the optical assembly 50 of the present embodiment, the low refractive index material of the low refractive index layer 60 contains an inorganic hollow filler having transparency at visible wavelengths, for example, a hollow filler of $SiO_2$. According to the optical assembly 50 of the present embodiment, hollow portions of inorganic hollow fillers are scattered in the low refractive index layer 60, and increase of the refractive index of the low refractive index layer 60 can be effectively suppressed.

A preferred embodiment of the present invention has so far been specifically described. However, the present invention should not be construed as limited to the specific embodiment, which can be altered and combined within a range not departing from the spirit of the present invention. Some modifications will be shown below, but these are not all, and other modifications are also possible. Two or more of these modifications may be combined.

For example, in the above embodiment, the optical assembly 50 is applied to the range image sensor 10 and is arranged at the Z direction fordward side of the microlens 30 in the Z direction. However, the configuration adjacent to the optical assembly 50 in the Z direction is not limited to the stacked structure with the substrate 20, the CMOS image sensor 24, the color filter 28 and the microlens 30. The optical assembly 50 can be applied to any component requiring a low refractive index layer 60 having a refractive index (that is, a low refractive index) as close as possible to air and a diffraction grating 70 arranged on the surface 60a of the low refractive index layer 60.

Moreover, the present invention is not limited to the above-described embodiment, and can be widely applied to a lens array in which a low refractive index layer containing a hollow filler is formed on a microlens and further other layers are formed on it. Therefore, it can be applied to, for example, a lens sheet arranged on an organic EL (OLED).

The organic EL may be covered with a cover layer such as glass. In this case, when the microlens is formed on the organic EL, the unevenness of the lens may cause separation between the microlens and the cover layer. Therefore, it is preferable to provide a low refractive index layer between the microlens and the cover layer. In this case, a layered configuration is formed by layering cover layers such as an organic EL, a color filter, a lens array of the present invention (microlens and low refractive index layer), and glass, in this order. Even in this case, the formation of stains can be suppressed by adopting the configuration of the present invention.

The functional layer formed on the low refractive index layer is not limited to the diffraction grating described above, and the technical idea of the present invention can be applied to any layer formed using a coating solution containing a solvent, such as an antiglare layer and an antifouling layer. The cover layer described above is also one aspect of a functional layer, although it is not formed using a coating solution.

The present application addresses the following.

Three-dimensional sensing devices using complementary metal-oxide-semiconductor (CMOS) image sensors have been developed as inexpensive and compact range image sensors. A diffraction grating, for example, is used to convert a two-dimensional image captured by a CMOS image sensor into a three-dimensional image. That is, referring to the structure of the device described in JP 2019-195051 A, a CMOS image sensor is provided in the photoelectric conversion portion, and a diffraction grating is formed on the top surface of the functional layer. With the optical assembly formed in this way, information on the distance to the object can be obtained by image processing of the light separated by wavelength by the diffraction grating.

As in the above optical assembly, when a light-receiving elements such as a CMOS image sensor is embedded in the surface of the substrate of the photoelectric conversion portion and an RGB color filter or microlens is formed on the surface of the substrate, a flattening layer (corresponding to the above functional layer) covering the microlens is provided. The flattening layer has a predetermined thickness to secure the optical path in the thickness direction of the microlens. As an optical assembly that enables three-dimensional sensing, the material of the diffraction grating is first laid in layers on the top surface of the flattening layer, and then a part of the material remains periodically in the direction along the surface after patterning to form a diffraction grating. A low refractive index material having a refractive index close to that of air is used for the flattening layer to prevent light passing through the diffraction grating from being refracted in an unexpected direction. However, when a diffraction grating is formed on the surface of the flattening layer, the material of the diffraction grating penetrating into the low refractive index material of the flattening layer may cause spot-like "stains" when viewed in plan view along the thickness direction of the flattening layer. When stains occur in this way, the appearance is poor, and stains act on the light as a wavefront conversion pattern other than the diffraction grating, and the desired three-dimensional sensing function cannot be obtained in the optical assembly.

The present invention has an aspect to provide an optical assembly which can suppress the rise of the refractive index and poor appearance of the flattening layer portion (layer) and can prevent formation of stains due to the material of the diffraction grating formed on the surface of the flattening layer penetrating into the flattening layer.

The optical assembly according to an embodiment of the present invention includes a layer containing a low refractive index material and a medium; and a functional layer which is arranged on a surface of the layer, and a content of the low refractive index material in the layer is 60% by mass or more and 76% by mass or less.

According to an embodiment of the present invention, it is possible to suppress the rise of the refractive index and degradation of appearance of the flattening layer portion (layer) in the optical assembly, and to prevent the formation of stains due to the material of the diffraction grating formed on the surface of the flattening layer (layer) penetrating into the flattening layer.

REFERENCE SIGNS LIST

50 Optical assembly
60 Low refractive index layer (layer)
70 Diffraction grating Obviously, numerous modifications and variations of the present invention are possible in light of the above teachings. It is therefore to be understood that within the scope of the appended claims, the invention may be practiced otherwise than as specifically described herein.

What is claimed is:

1. An optical assembly, comprising:
a first layer comprising a low refractive index material and a medium; and
a second layer that is a functional layer formed on a surface of the first layer;
wherein
the first layer comprises the low refractive index material at a content of 60%-76% by mass,
the first layer has a refractive index at a visible wavelength of 1.25-1.33, and
the first layer has a penetration amount of 0.06 µm or less; and
the second layer comprises a diffraction grating that is transparent at visible wavelengths and has an overall light transmittance of at least 90% for light at visible wavelengths.

2. The optical assembly according to claim 1, wherein the low refractive index material comprises silicon dioxide.

3. The optical assembly according to claim 2, wherein the low refractive index material comprises an inorganic hollow filler having transparency at a visible wavelength.

4. The optical assembly according to claim 1, wherein the low refractive index material comprises an inorganic hollow filler having transparency at a visible wavelength.

* * * * *